(12) United States Patent
Song et al.

(10) Patent No.: US 12,493,561 B2
(45) Date of Patent: Dec. 9, 2025

(54) DRAM CACHE SYSTEM AND OPERATING METHOD OF THE SAME

(71) Applicant: UIF (University Industry Foundation), Yonsei University, Seoul (KR)

(72) Inventors: William Jinho Song, Seoul (KR); Youngin Kim, Seoul (KR); Hyeonjin Kim, Seoul (KR)

(73) Assignee: UIF (University Industry Foundation), Yonsei University, Seoul (KR)

(*) Notice: Subject to any disclaimer, the term of this patent is extended or adjusted under 35 U.S.C. 154(b) by 0 days.

(21) Appl. No.: 18/627,459

(22) Filed: Apr. 5, 2024

(65) Prior Publication Data
US 2024/0345964 A1  Oct. 17, 2024

(30) Foreign Application Priority Data

Apr. 11, 2023 (KR) .................. 10-2023-0047601

(51) Int. Cl.
*G06F 12/10* (2016.01)
*G06F 12/0882* (2016.01)
(Continued)

(52) U.S. Cl.
CPC ...... *G06F 12/1027* (2013.01); *G06F 12/0882* (2013.01); *G06F 12/0891* (2013.01)

(58) Field of Classification Search
CPC ............. G06F 12/1027; G06F 12/0882; G06F 12/0891; G06F 12/0802; G06F 3/0604;
(Continued)

(56) References Cited

U.S. PATENT DOCUMENTS

| 5,613,083 A | 3/1997 | Glew et al. |
| 2012/0137079 A1* | 5/2012 | Ueda ............... G06F 12/1036 711/141 |

(Continued)

FOREIGN PATENT DOCUMENTS

| KR | 10-1893544 B1 | 8/2018 |
| KR | 10-2018-0103907 A | 9/2018 |
| KR | 10-2022-0067070 A | 5/2022 |

OTHER PUBLICATIONS

Youngin Kim, et al., "Nomad: Enabling Non-blocking OS-managed DRAM Cache via Tag-Data Decoupling", IEEE, Mar. 24, 2023, Montral, Canada, Published in: 2023 IEEE International Symposium on High-Performance Computer Architecture (HPCA), DOI: 10.1109/HPCA56546.2023.10071016, 13 pages.

(Continued)

*Primary Examiner* — Hua J Song
(74) *Attorney, Agent, or Firm* — Park, Kim & Suh, LLC

(57) ABSTRACT

Disclosed are a DRAM cache system and an operating method thereof. The DRAM cache system includes a front-end module including a translation lookaside buffer (TLB) and a page table entry (PTE) and a back-end module, and the operating method includes checking, by the front-end module, the PTE when a TLB miss occurs in association with a memory request, calling, by the front-end module, a miss handler when a result of the checking the PTE is a tag miss, performing, by the front-end module, a tag update corresponding to the memory request through the miss handler, and offloading, by the front-end module, a cache-fill command to the back-end module.

17 Claims, 8 Drawing Sheets

(51) Int. Cl.
*G06F 12/0891* (2016.01)
*G06F 12/1027* (2016.01)

(58) Field of Classification Search
CPC .............. G06F 3/0659; G06F 12/1009; G06F 2212/1016; G06F 2212/604
USPC ........................................................ 711/118
See application file for complete search history.

(56) References Cited

U.S. PATENT DOCUMENTS

| 2022/0035632 | A1* | 2/2022 | Cain, III | ............. | G06F 9/30036 |
| 2023/0297285 | A1* | 9/2023 | Majumdar | ........ | G11C 11/40611 |
| | | | | | 711/108 |

OTHER PUBLICATIONS

AMD64 Architecture Programmer's Manual vol. 2: System Programming, AMD Techonology, Publication No. 24593, Revision 3.41, Jun. 2023, Retrieved from the Internet: <URL: https://www.amd.com/en/search/documentation/hub.html#q=AMD64%20Architecture%20Programmer%E2%80%99s%20Manual%20Volume%202%3A%20System%20Programming&sortCriteria=%40amd_release_date%20descending>, 833 pages.

Yongjun Lee, et al., "A Fully Associative, Tagless DRAM Cache", Published in: 2015 ACM/IEEE 42nd Annual International Symposium on Computer Architecture (ISCA), Jun. 13-17, 2015, DOI: 10.1145/2749469.2750383, 12 pages.

\* cited by examiner

DRAM CACHE SYSTEM AND OPERATING METHOD OF THE SAME

CROSS-REFERENCE TO RELATED APPLICATIONS

This application claims priority under 35 U.S.C. § 119 to Korean Patent Application No. 10-2023-0047601 filed on Apr. 11, 2023, in the Korean Intellectual Property Office, the disclosures of which are incorporated by reference herein in their entireties.

BACKGROUND

Embodiments of the present disclosure described herein relate to a DRAM cache system, and more particularly, relate to an operating method of the same.

The present disclosure is derived from a basic personal study (Project Identification Number: 1711190949, Project Number: 2021R1A2C1095162, Research Project Name: Design and Optimization of Accelerator Processor for On-Device Personalized Recommendation System, Project Management Agency: National Research Foundation of Korea, Research Period: from Sep. 1, 2021 to Feb. 29, 2024) conducted by the Ministry of Science and ICT, and from a study (Project Identification Number: 1711193831, Project Number: 2020-0-01847-004, Research Project Name: Development of Semiconductor System Convergence Innovation Technology for Non-face-to-face and Artificial Intelligence Society, Task Management Agency: Institute of Information & Communication Technology Planning & Evaluation, Research Period: from Jul. 1, 2020 to Dec. 31, 2025) conducted as a part of Information and Communication Broadcasting Innovation Talent Development of the Ministry of Science and ICT. On the other hand, there is no property interest of the Korean government in any aspect of the present disclosure.

As a memory bandwidth and a memory capacity which a new application requires increases, a heterogeneous memory system includes both a high-bandwidth on-package dynamic random access memory (DRAM) with a high-capacity off-package memory. In the heterogeneous memory system, an on-package DRAM is designed as a cache, and DRAM cache (DC) designs are classified into two categories, that is, a hardware-based management scheme and an operating system (OS) management scheme.

FIG. 1 is a diagram illustrating an operation of a conventional hardware-based DRAM cache. Referring to FIG. 1, a hardware-based DRAM cache may process subsequent memory requests without needing to wait until a preceding miss is completed, by offloading miss processing for a memory request to a miss status/information holding register (MSHR). In other words, the hardware-based DRAM cache performs a non-blocking miss handling function.

Additionally, according to the hardware-based scheme, a controller of the DRAM cache may send a response to a last-level cache as soon as a requested memory block arrives from an off-package memory without waiting for the entire cache, and thus, an effective miss latency may be minimized.

However, in the hardware-based DRAM cache, because metadata (e.g., tags, valid bits, and dirty bits) are stored in the on-package DRAM, the access to the metadata may cause additional bandwidth consumption in the on-package DRAM. In this case, an effective cycle time of the DRAM cache access increases. This means that performance is degraded.

FIG. 2 is a diagram illustrating an operation of a conventional OS-managed DRAM cache. Referring to FIG. 2, the OS-managed DRAM cache exposes the on-package DRAM to the OS and stores data in a page unit. Here, a page table entry (PTE) may use an OS-managed caching mechanism without modifying the memory controller by storing a tag (i.e., a cache frame number) and searching the translation lookaside buffer (TLB) for the tags. According to the OS management method, a cache address (CA) may be directly obtained when a TLB hit occurs, and thus, the bandwidth of the on-package DRAM is not wasted to transmit the metadata. Accordingly, an ideal DRAM cache (DC) access time may be implemented.

However, the OS management system implements a blocking cache in that an application is interrupted while the OS processes a DRAM cache (DC) miss. In other words, in the OS management method, the application interruption is inevitable because the OS performs a cache fill in the event of the DC miss to ensure a data hit in the event of a tag hit. Because the OS management method uses a coupled tag-data management scheme where a tag hit guarantees a data hit, tags are updated only after the cache fill is performed, which results in latency.

Therefore, there is required a method capable of quickly updating tags without the interruption of the application while not causing an additional bandwidth in the on-package DRAM due to the metadata transmission performed when the tag miss occurs.

SUMMARY

Embodiments of the present disclosure provide a DRAM cache system capable of minimizing a delay time when a tag miss occurs and an operating method thereof.

In the other hand, the technical issues to be implemented in the present disclosure are not limited to the technical issues mentioned above, and any other technical issues not mentioned will be clearly understood by those skilled in the art from the description below.

According to an embodiment, a DRAM cache system may include a front-end module and a back-end module, and the front-end module may perform a non-blocking miss processing through a decoupled tag-data management method.

The front-end module may include a translation lookaside buffer (TLB) and a page table entry (PTE). When a TLB miss occurs in association with a memory request, the front-end module may check the PTE. When a result of checking the PTE indicates a tag miss, the front-end module may call a miss handler, may perform a tag update corresponding to the memory request through the miss handler, and may offload a cache-fill command to the back-end module.

The front-end module may further include a page descriptor including a physical page descriptor and a cache page descriptor, and the physical page descriptor may include two additional bits including a cached bit and a non-cacheable bit. The cached bit may indicate whether a corresponding page is cached in a DRAM cache, and the non-cacheable bit may indicate whether the corresponding page is cacheable. The cached bit and the non-cacheable bit may be added to unused fields of the PTE.

When the PTE is inspected, the front-end module may determine a tag hit or the tag miss by using the cached bit and the non-cacheable bit added to the unused fields of the PTE.

The front-end module may further include a background eviction daemon proactively evicting a cached frame in a DRAM cache, and when the previously evicted page is dirty, the background eviction daemon may offload a write-back command to the back-end module.

The back-end module may include an interface receiving the cache-fill command or the write-back command from the front-end module.

The interface may be a register and may include fields of a state bit, a type bit, physical frame number (PFN) bits, cache frame number (CFN) bits, and offset bits.

The state bit may indicate whether the interface is in use, the type bit may specify a command type of the cache-fill command or the write-back command, the PFN bits may be used to store a PFN corresponding to the cache-fill command or the write-back command, and the CFN bits may be used to store a CFN corresponding to the cache-fill command or the write-back command.

When the interface receives the cache-fill command or the write-back command from the front-end module, the back-end module may allocate one or more page copy status/information holding registers (PCSHRs) to process the corresponding command.

When the cache access is received, the back-end module may further include a comparator comparing a CFN included in a cache access with a CFN of the PCSHRs.

When a result of comparing the CFN of the PCSHRs indicates that there is a CFN tag corresponding to the cache access in the PCSHRs, the comparator may regard the cache access as a data miss and may generate a subblock for processing the data miss in a corresponding PCSHR.

When a result of comparing the CFN of the PCSHRs indicates that there is no CFN tag corresponding to the cache access in the PCSHRs, the comparator may regard the cache access as a data hit.

According to an embodiment, an operating method of a DRAM cache system which includes a front-end module including a translation lookaside buffer (TLB) and a page table entry (PTE) and a back-end module includes checking, by the front-end module, the PTE when a TLB miss occurs in association with a memory request, calling, by the front-end module, a miss handler when a result of checking the PTE is a tag miss, performing, by the front-end module, a tag update corresponding to the memory request through the miss handler, and offloading, by the front-end module, a cache-fill command to the back-end module.

The front-end module may further include a page descriptor including a physical page descriptor and a cache page descriptor, and the physical page descriptor may include two additional bits including a cached bit and a non-cacheable bit. The cached bit may be a bit indicating whether a corresponding page is cached in a DRAM cache, and the non-cacheable bit may be a bit indicating whether the corresponding page is cacheable. The performing of the tag update may include adding the cached and non-cacheable bits to unused fields of the PTE.

The operating method of the DRAM cache system may further include receiving, by the back-end module, the cache-fill command through an interface as a register.

The interface may be implemented with fields including a state bit, a type bit, physical frame number (PFN) bits, and cache frame number (CFN) bits, and the state bit may indicate whether the interface is in use, and the type bit may specify a command type of the cache-fill command. The PFN bits may be used to store a PFN corresponding to the cache-fill command, and the CFN bits may be used to store a CFN corresponding to the cache-fill command.

The operating method of the DRAM cache system may further include allocating, by the back-end module, one or more page copy status/information holding registers (PCSHRs) to process the cache-fill command when the interface receives the cache-fill command.

The operating method of the DRAM cache system may further include determining, by the back-end module, whether the cache access is a data miss or a data hit through comparing a CFN included in the cache access with a CFN of the PCSHRs when a cache access is received.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
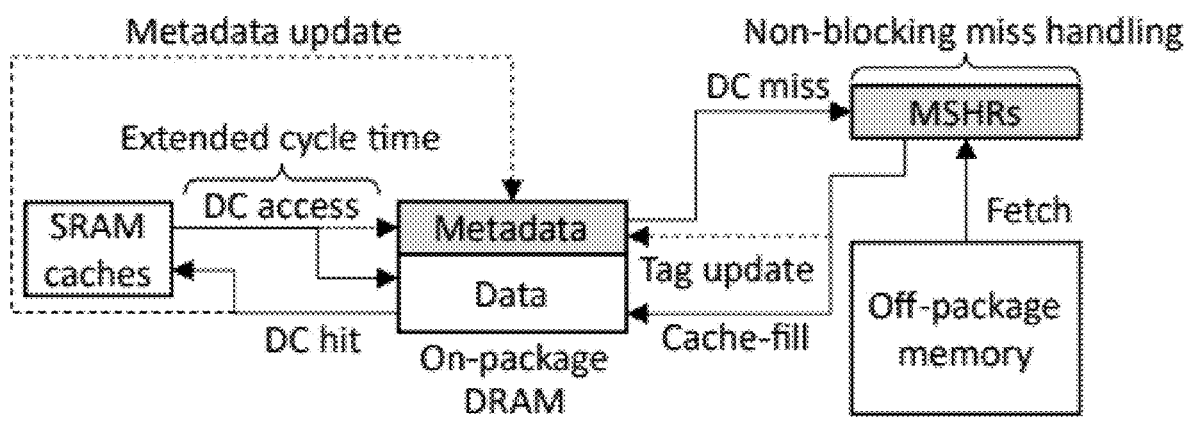
FIG. 1 is a diagram illustrating an operation of a conventional hardware-based DRAM cache.
Figure 2:
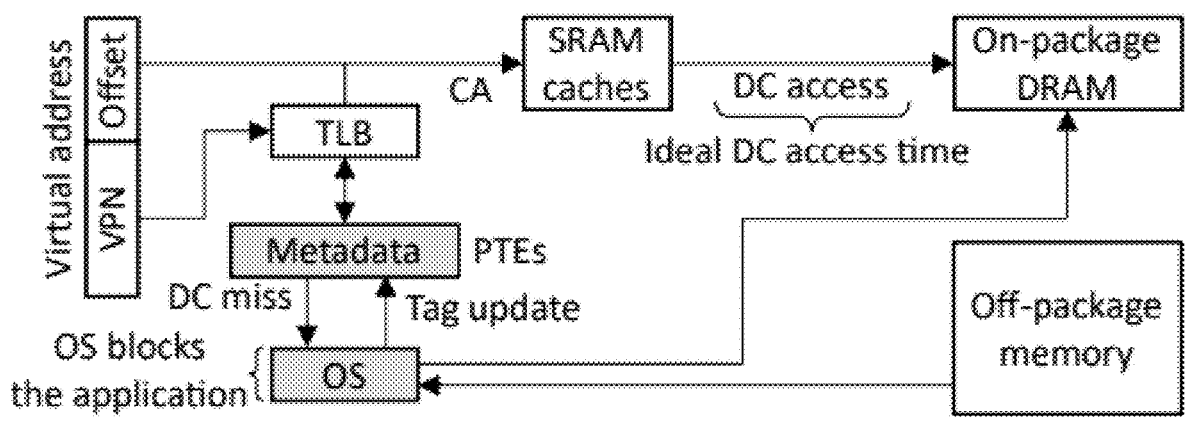
FIG. 2 is a diagram illustrating an operation of a conventional OS-managed DRAM cache.

Throughout the specification, the same reference numerals refer to the same components. The present specification does not describe all elements of the embodiments, and a general content or an overlapping content between the embodiments in the technical field to which the present disclosure pertains is omitted. The term "~module" used in the specification may be implemented in software or hardware, and according to embodiments, a plurality of "~modules" may be implemented as a single component, or a single "~module" may include a plurality of components. A function provided by the "~module" may be performed separately by a plurality of components or may be integrated with other additional components. The "~module" of the present specification is not limited to software or hardware, and may be configured to be in an addressable storage medium, or may be configured to play one or more processors.

In addition, when a part "includes" a component, it means that it may further include other components rather than excluding the other components unless specifically stated to the contrary. A singular expression includes a plural expression unless there is an obvious exception in context. An identification code is used for convenience of explanation at each stage, and the identification code does not describe the order of each step, and each step may be performed differently from a specified order unless the specific order is explicitly stated in the context.

Hereinafter, embodiments of the present disclosure will be described in more detail with reference to accompanying drawings. Embodiments of the present disclosure may be modified in various forms, and the scope of the present disclosure should not be construed as being limited to following embodiments. This embodiment is provided to those of ordinary skill in the art to explain the present disclosure more fully. Therefore, the shape of the elements in the drawings is exaggerated to emphasize a clearer description.

To clarify the solution for the problem to be solved by the present disclosure, the configuration of the present disclosure will be described in detail with reference to the accompanying drawings based on the preferred embodiment of the present disclosure, but in assigning a reference number to a component of the drawing, the same component is assigned the same reference number even though it is on different drawings, and it is noted in advance that components of other drawings may be cited when necessary for the description of the drawings.

In embodiments of the present disclosure, to activate a non-blocking OS management DRAM cache, a method of managing decoupled tag-data rather than managing coupled tag-data is directed to provide. In embodiments of the present disclosure, the decoupled tag-data management method may control a tag and data through different procedures. In this case, only the tag is updated when a tag miss occurs and a stopped application is immediately resumed, which may significantly reduce waiting time due to miss processing.

Figure 3:
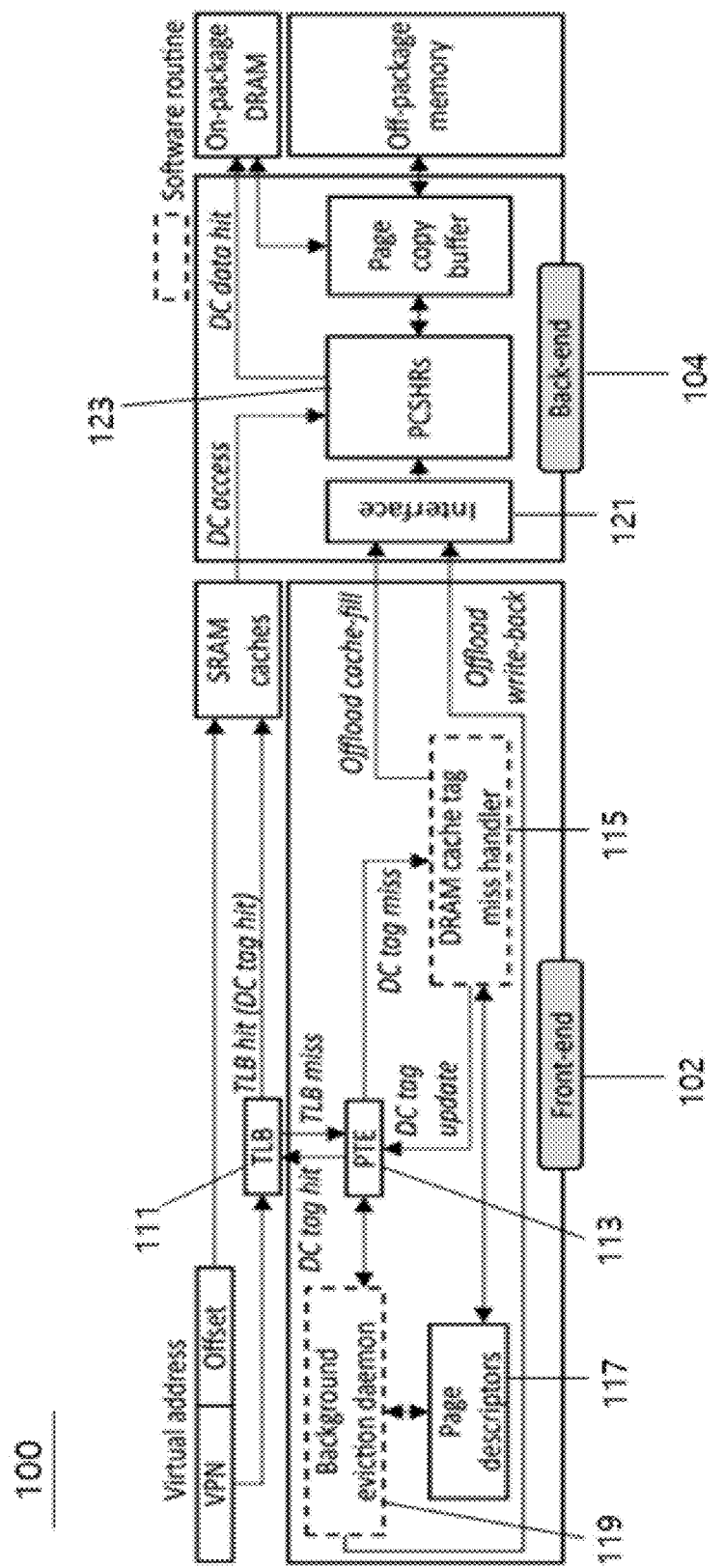
FIG. 3 is a diagram illustrating a DRAM cache system according to an embodiment of the present disclosure.

FIG. 3 is a diagram illustrating a DRAM cache system according to an embodiment of the present disclosure.

Referring to FIG. 3, a DRAM cache system 100 may include a front-end module 102 and a back-end module 104.

The front-end module 102 may be implemented based on an OS management method. However, the front-end module 102 may perform a non-blocking miss processing through the decoupled tag-data management method.

According to the disclosed embodiment, because the decoupled tag-data management method controls the tag and data through different procedures, a tag hit does not necessarily guarantee a data hit in a DRAM cache.

In an embodiment, when the tag miss occurs, the front-end module 102 may offload the cache-fill command to the back-end module 104 while updating only the tag and immediately restarting the stopped application. To do this, it is necessary to check whether all of DRAM cache accesses have data through the back-end module 104, but a non-blocking miss processing becomes possible and the waiting time due to the miss processing may be reduced.

Specifically, the front-end module 102 may manage the tag in the DRAM cache by using a translation lookaside buffer TLB 111 and a page table entry PTE 113.

When a memory request including a virtual address is received from a processor, the front-end module 102 may check whether an address translation corresponding to the memory request is in the TLB 111.

When there is the address translation corresponding to the memory request, the TLB 111 may translate a virtual page number VPN into a physical frame number PFN and may return it, which is referred to as a "TLB hit".

When there is no address translation corresponding to the memory request in the TLB 111, the front-end module 102 inspects the PTE 113, which is referred to as a "TLB miss". When there is a physical page (a page of a physical address space) mapped to a virtual page (a page of a virtual address space) through inspecting the PTE 113, the front-end module 102 may transmit the physical page mapped to the virtual page to the TLB 111, which is referred to as a "tag hit".

On the other hand, when there is no physical page mapped to the virtual page as an inspection result of the PTE 113 (i.e., in the case of the tag miss), the front-end module 102 may call a miss handler 115. In this case, the front-end module 102 may call the miss handler 115 through an OS routine, and execution of a corresponding application is paused for a while.

The miss handler 115 may update the tag of the DRAM cache by replacing the PFN of the PTE 113 with a cache frame number CFN serving as the tag of the new cache frame, which is referred to as a "tag update". In this case, mapping information between the PFN and the CFN may be stored in a page descriptor 117. Simultaneously, the miss handler 115 may offload the cache-fill command to the back-end module 104. In addition, the front-end module 102 may immediately resume the execution of the corresponding application.

That is, in the disclosed embodiment, when a tag is missed, the front-end module 102 may call the miss handler 115 to update the tag and then may offload the cache-fill command to the back-end module 104 so that the application is immediately resumed without interruption.

Meanwhile, the front-end module 102 may manage a page frame by using the PTE 113 and the page descriptor 117. In the disclosed embodiment, the PTE 113 and the page descriptor 117 may have an extended function in addition to the function of conventional PTE and page descriptor.

Figure 4:
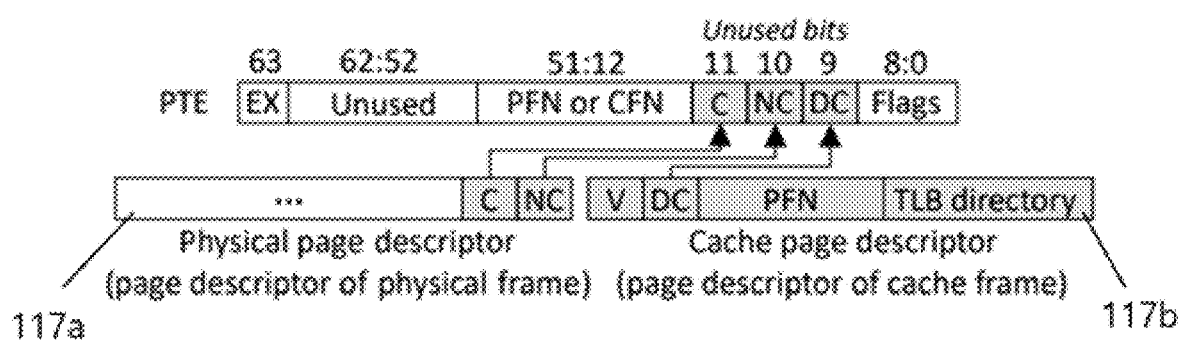
FIG. 4 is a diagram illustrating a page management by using a PTE and a page descriptor according to an embodiment of the present disclosure.

FIG. 4 is a diagram illustrating a page management by using the PTE 113 and the page descriptor 117 according to an embodiment of the present disclosure.

Referring to FIG. 4, the page descriptor 117 may include a physical page descriptor 117a and a cache page descriptor 117b. Here, the physical page descriptor 117a may be extended through two additional bits of cached (C) and non-cacheable (NC).

The C bit may be a bit indicating whether the page is cached in the DRAM cache. The NC bit may be a bit indicating whether the page is cacheable. The two bits added in the physical page descriptor 117a are also added to unused fields of the PTE 113 because they are used to determine the tag miss (i.e., cacheable but not cached) during the address translation.

The tag may be directly updated in the front-end module 102 through the added C bit and the NC bit of the physical page descriptor 117a, which results in reducing a latency time. The front-end module 102 may determine the tag hit or the tag miss through the C bit and the NC bit added to the unused field of the PTE 113.

Also, in the cache page descriptor 117b, a valid V bit indicates a validity of cache frame mapping, and a dirty-in-Cache DC bit may serve to indicate whether a write-back for an off-package memory is required in a cache frame in the case of an eviction. Here, the DC bit is also stored in the PTE 113.

The cache page descriptor 117b includes also the PFN of the physical frame mapped to the cache frame, and a TLB directory may be used to avoid a TLB shootdown through tracking whether cache frame information resides in the TLB 111.

When the front-end module 102 calls the miss handler 115 (i.e., in the case of the tag miss), the miss handler 115 may first inspect the cache page descriptor 117b of the cache frame indicated by the head of an available queue for validity verification.

The miss handler 115 may transmit the cache-fill command to the back-end module 104 when a usable cache frame is found. Then, the front-end module 102 may store the original PFN in a PFN field of the cache page descriptor 117b, and the PTE 113 may update a new CFN and the C bit. That is, the PFN of the PTE 113 may be replaced with the CFN serving as the tag of the new cache frame. Thereafter, the front-end module 102 may resolve the tag miss and resume the corresponding application even when the data of the new cache frame is still not available.

Also, the front-end module 102 may include a background eviction daemon 119 which evicts the cache frame from the DRAM cache in advance. In this case, when the evicted page is dirty, the background eviction daemon 119 may offload a write-back command to the back-end module 104.

In an embodiment of the present disclosure, the front-end module 102 may manage the cache frame by using a first-in-first-out (FIFO) policy and a circular free queue.

Figure 5:
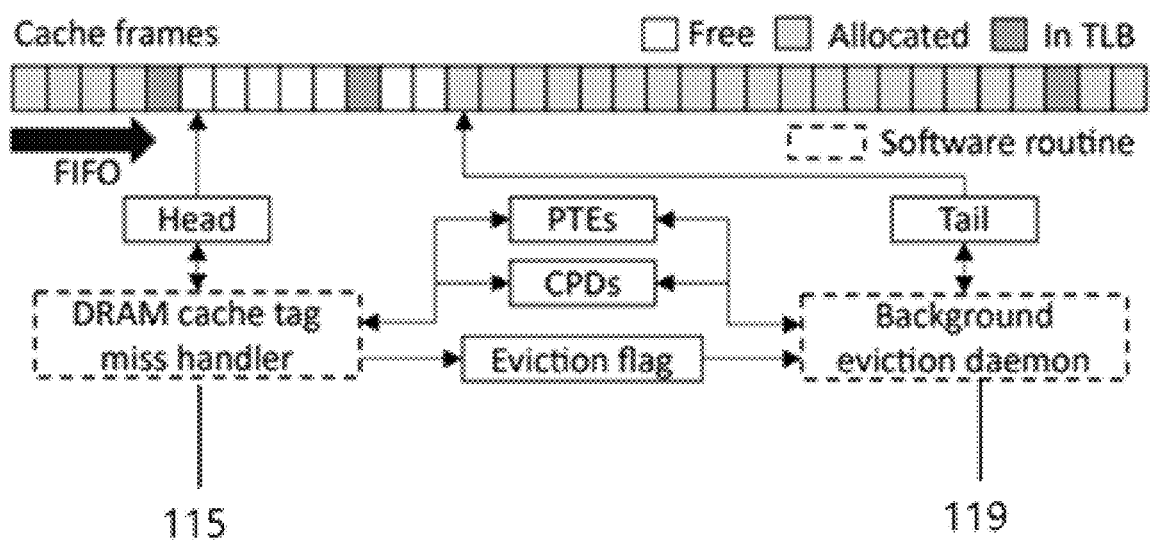
FIG. 5 is a diagram illustrating a state in which a front-end module manages a cache frame according to an embodiment of the present disclosure.

FIG. 5 is a diagram illustrating a state in which the front-end module 102 manages the cache frame according to an embodiment of the present disclosure.

Referring to FIG. 5, the cache frame may be allocated from the head depending on a request by the miss handler 115 and may be evicted from the tail in advance by the background eviction daemon 119.

The miss handler 115 tracks the number of cache frames available to set an eviction flag, which may be processed by the background eviction daemon 119.

That is, the background eviction daemon 119 may be called when the miss handler 115 sets an eviction flag. The background eviction daemon 119 may perform the cache frame reclamation in a FIFO scheme. In this case, a series of cache frames may be evicted in advance to avoid frequent calls of the background eviction daemon 119.

To avoid a TLB shootdown, the background eviction daemon 119 may skip the cache frame in which address translation information remains in the TLB 111 with reference to a TLB directory field of a cache page descriptor CPD. In addition, the background eviction daemon 119 may check whether the write-back is required through the dirty-in-Cache DC bit of the CPD and transmit the write-back command to the back-end module 104.

The back-end module 104 may be implemented based on hardware. However, the back-end module 104 differs from the conventional hardware-based DRAM cache in that the back-end module 104 is controlled by software through an interface 121 and performs the cache-fill and the write-back by using a page copy status/information holding register PCSHR 123.

The back-end module 104 may simultaneously execute the cache-fill command and the write-back command of the PCSHR 123, and may gradually update a copy state of a corresponding page. Here, because the back-end module 104 starts a memory request with a valid cache address by referring to the TLB 111, there is no need to perform an additional operation to obtain a cache address.

However, in the disclosed embodiment, because of the decoupled tag-data management, the TLB hit does not guarantee the existence of corresponding page data. Accordingly, the back-end module 104 may inquire the PCSHR 123 whether there is the tag corresponding to the cache access with respect to the TLB hit. Here, when there is the tag corresponding to the cache access, the cache access is regarded as a data miss, and when there is no tag corresponding to the cache access, it means that the entire page data is fetched in an on-packaged DRAM, and thus, it may be regarded as the "data hit".

Figure 6:
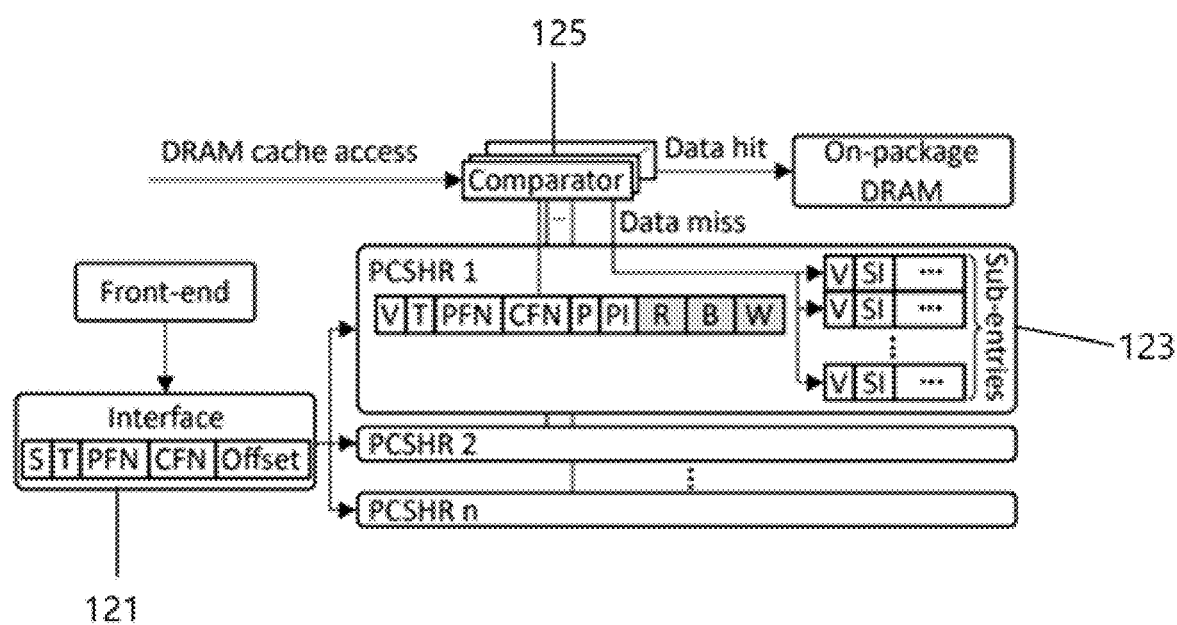
FIG. 6 is a diagram explaining a configuration and an operation of a back-end module according to an embodiment of the present disclosure.

FIG. 6 is a diagram illustrating a configuration and an operation of the back-end module 104 according to an embodiment of the present disclosure.

Referring to FIG. 6, the interface 121 may receive the cache-fill command or the write-back command from the front-end module 102. In an embodiment of the present disclosure, the interface 121 may be a memory-mapped device register.

The interface 121 may include fields such as a state: S bit, a type: T bit, PFN bits, CFN bits, offset bits, and the like.

Here, the S bit may indicate whether an interface is in use. The front-end module 102 may send a command only when the interface 121 is in an idle state.

The T bit may specify a command type of the cache-fill command or the write-back command. The PFN bits may be used to store the PFN corresponding to the cache-fill command or the write-back command.

The CFN bits may be used to store the CFN corresponding to the cache-fill command or the write-back command.

When the back-end module 104 receives the cache-fill command or the write-back command from the front-end module 102, the back-end module 104 may allocate one or more PCSHRs 123 to process the corresponding command. In an embodiment, the back-end module 104 may allocate a plurality of PCSHRs 123 to simultaneously process multiple page copy commands.

The PCSHRs 123 may include fields such as a valid: V bit, a type: T bit, PFN bits, CFN bits, a priority: P bit, a prioritized sub-block index: PI bit, a read-issued: R bit, an in-buffer: B bit, a partial-write: W bit, and the like.

Here, the V bit may indicate whether the corresponding PCSHR 123 is valid.

The T bit may specify the command type of the cache-fill command or the write-back command.

The PFN bits may be used to store the PFN corresponding to the cache-fill command or the write-back command.

The CFN bits may be used to store the CFN corresponding to the cache-fill command or the write-back command.

The T bit, the PFN bits, and the CFN bits may be received from the interface 121.

The P bit may indicate whether there is a priority sub-block, and the PI bit may indicate the index of the priority subblock. In the cache-fill command, the P bit may be set, and the PI bit may be inferred from offset bits of the interface 121.

The R bit, the B bit, and the W bit may be used to track the status of a subblock.

The R bit and the W bit may indicate whether read and write transmissions of subblocks are issued, respectively.

The in-buffer B bit may represent subblock data currently available in a copy buffer while the page is being transmitted.

When the cache access is received, the back-end module 104 may compare the CFN included in the cache access with the CFN of the PCSHR 123 through a comparator 125 to determine whether there is the CFN tag corresponding to the cache access. For this purpose, the comparator 125 may be connected to the CFN bits of each PCSHR 123.

That is, because the disclosed embodiment manages decoupled tag-data, the back-end module 104 may be able to solve the data omission. To this end, the comparator 125 may check whether there are the corresponding tags for all the cache accesses.

As a result of comparing the comparator 125, when the PCSHR 123 has the CFN tag corresponding to the cache access, the cache access may be regarded as the data miss. In this case, the back-end module 104 may generate a sub-block (or may be referred to as a "sub-entry") for processing the data miss in the PCSHR 123 having the CFN tag corresponding to the cache access.

The cache access of the data miss may be held in the generated sub-block. A pending cache access in the sub-block may be processed differently depending on the type of cache access (i.e., read or write) and the state of the corresponding sub-block.

As a result of comparing the comparator 125, when the PCSHR 123 does not have the CFN tag corresponding to the cache access, it means that the entire page data is fetched in the on-packaged DRAM, so it is regarded as the data hit and the entire page data is available in the DRAM cache.

Figure 7:
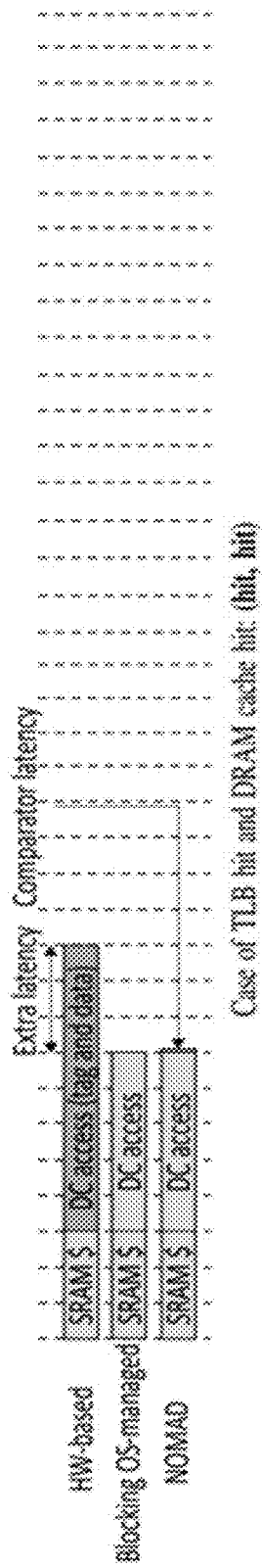
FIG. 7 is a diagram comparing a delay time with respect to a TLB hit and a tag hit.
Figure 8:
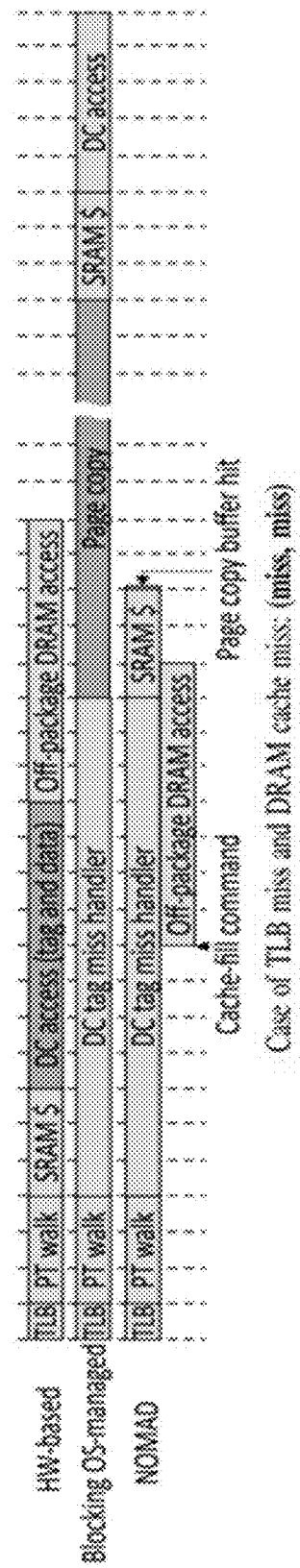
FIG. 8 is a diagram comparing a delay time with respect to a TLB miss and a tag miss.

FIG. 7 and FIG. 8 are diagrams for comparing delay times of the conventional hardware-based method and the OS-management (Blocking OS-management) method with the delay time of the DRAM management method of the present disclosure (indicated by NOMAD in the drawing). FIG. 7 is a diagram for comparing delay times with respect to the TLB hit and the tag hit, and FIG. 8 is a diagram for comparing delay times with respect to the TLB miss and the tag miss.

Referring to FIG. 7, it may be seen that in the NOMAD, the delay time is reduced compared to the hardware-based method, and the delay time is very slightly increased compared to the OS management method. That is, because the NOMAD compares with respect to every cache access whether there is a corresponding tag in the back-end module 104, it may be seen that the delay time due to the comparison is added compared to the OS management method, but a very short delay time is added.

Referring to FIG. 8, it may be seen that the delay time of the NOMAD is reduced compared to the hardware-based method, and is significantly reduced compared to the OS management method. That is, because the NOMAD performs a non-blocking miss-processing through the decoupled tag-data management method unlike the conventional OS management method, the delay time of the NOMAD caused by the non-blocking miss processing may be significantly reduced compared to the conventional OS management method.

In addition, when both the delay times of FIG. 7 and FIG. 8 are reflected, it may be seen that the total delay time of the NOMAD is reduced compared to the conventional hardware method and OS management method.

According to one aspect of the present disclosure, by performing a decoupled tag-data management in a DRAM cache system, overall delay time may be minimized even while solving data miss in the case of a DRAM tag miss.

In addition, according to an embodiment of the present disclosure, an efficient data management is performed through a decoupled tag-data management in the DRAM cache system, which may improve a performance such as increasing data processing speed or reducing required memory capacity compared to a conventional cache system.

Meanwhile, the effects which may be obtained from the present disclosure are not limited to the effects mentioned above, any other effects not mentioned will be clearly understood by those skilled in the art from the description below.

The above detailed description is illustrative of the present disclosure. Additionally, the foregoing is intended to illustrate preferred embodiments of the present disclosure, and the present disclosure may be used in various other combinations, modifications, and environments. That is, changes or modifications may be made within a scope of the present concept disclosed in this specification, a scope equivalent to the written disclosure, and/or within a scope of technology or knowledge in the art. The written examples illustrate a best state for implementing a technical idea of the present disclosure, and various changes required for specific application fields and uses of the present disclosure are also possible. Accordingly, the detailed description of the disclosure above is not intended to limit the disclosure to the disclosed embodiments. Additionally, the appended claims should be construed to include other embodiments as well.

What is claimed is:

1. A DRAM cache system comprising:
a front-end module; and
a back-end module,
wherein the front-end module is configured to perform a non-blocking miss processing through a decoupled tag-data management method,
wherein the front-end module further includes a background eviction daemon proactively evicting a cached frame in a DRAM cache, and
wherein, when a previously evicted page is dirty, the background eviction daemon offloads a write-back command to the back-end module.

2. The DRAM cache system of claim 1, wherein the front-end module includes a translation lookaside buffer (TLB) and a page table entry (PTE),
wherein, when a TLB miss occurs in association with a memory request, the front-end module checks the PTE,
wherein, when a result of checking the PTE indicates a tag miss, the front-end module calls a miss handler, and
wherein the front-end module performs a tag update corresponding to the memory request through the miss handler and offloads a cache-fill command to the back-end module.

3. The DRAM cache system of claim 2, wherein the front-end module further includes a page descriptor including a physical page descriptor and a cache page descriptor,
wherein the physical page descriptor includes two additional bits including a cached bit and a non-cacheable bit,
wherein the cached bit indicates whether a corresponding page is cached in a DRAM cache,
wherein the non-cacheable bit indicates whether the corresponding page is cacheable, and
wherein the cached bit and the non-cacheable bit are added to unused fields of the PTE.

4. The DRAM cache system of claim 3, wherein, when the PTE is inspected, the front-end module determines a tag hit or the tag miss by using the cached bit and the non-cacheable bit added to the unused fields of the PTE.

5. The DRAM cache system of claim 1, wherein the back-end module includes an interface receiving the cache-fill command or the write-back command from the front-end module.

6. The DRAM cache system of claim 5, wherein the interface is a register including fields of a state bit, a type bit, physical frame number (PFN) bits, cache frame number (CFN) bits, and offset bits.

7. The DRAM cache system of claim 6, wherein the state bit indicates whether the interface is in use,
wherein the type bit specifies a command type of the cache-fill command or the write-back command,
wherein the PFN bits are used to store a PFN corresponding to the cache-fill command or the write-back command, and wherein the CFN bits are used to store a CFN corresponding to the cache-fill command or the write-back command.

8. The DRAM cache system of claim 7, wherein the back-end module, when the interface receives the cache-fill command or the write-back command from the front-end module, allocates one or more page copy status/information holding registers (PCSHRs) to process the corresponding command.

9. The DRAM cache system of claim 8, wherein the back-end module further includes a comparator comparing a CFN included in a cache access with a CFN of the PCSHRs when the cache access is received.

10. The DRAM cache system of claim 9, wherein, when a result of comparing the CFN of the PCSHRs indicates that there is a CFN tag corresponding to the cache access in the PCSHRs, the comparator regards the cache access as a data miss and generates a subblock for processing the data miss in a corresponding PCSHR.

11. The DRAM cache system of claim 9, wherein, when a result of comparing the CFN of the PCSHRs indicates that there is no CFN tag corresponding to the cache access in the PCSHRs, the comparator regards the cache access as a data hit.

12. An operating method of a DRAM cache system including a front-end module including a translation lookaside buffer (TLB) and a page table entry (PTE) and a back-end module, the method comprising:
checking, by the front-end module, the PTE when a TLB miss occurs in association with a memory request and calling a miss handler when a result of checking the PTE is a tag miss; and
performing, by the front-end module, a tag update corresponding to the memory request through the miss handler and offloading a cache-fill command to the back-end module,
wherein the front-end module further includes a page descriptor including a physical page descriptor and a cache page descriptor,
wherein the physical page descriptor includes two additional bits including a cached bit and a non-cacheable bit,
wherein the cached bit is a bit indicating whether a corresponding page is cached in a DRAM cache,
wherein the non-cacheable bit is a bit indicating whether the corresponding page is cacheable, and
wherein the performing of the tag update includes adding the cached and non-cacheable bits to unused fields of the PTE.

13. The method of claim 12, further comprising:
receiving, by the back-end module, the cache-fill command through an interface as a register.

14. The method of claim 13, wherein the interface is implemented with fields including a state bit, a type bit, physical frame number (PFN) bits, and cache frame number (CFN) bits,
wherein the state bit indicates whether the interface is in use,
wherein the type bit specifies a command type of the cache-fill command,
wherein the PFN bits are used to store a PFN corresponding to the cache-fill command,
wherein the CFN bits are used to store a CFN corresponding to the cache-fill command.

15. The method of claim 14, further comprising:
when the interface receives the cache-fill command, allocating, by the back-end module, one or more page copy status/information holding registers (PCSHRs) to process the cache-fill command.

16. The method of claim 15, further comprising:
when a cache access is received, determining, by the back-end module, whether the cache access is a data miss or a data hit through comparing a CFN included in the cache access with a CFN of the PCSHRs.

17. A DRAM cache system comprising:
a front-end module; and
a back-end module,
wherein the front-end module is configured to perform a non-blocking miss processing through a decoupled tag-data management method,
wherein the front-end module includes a translation lookaside buffer (TLB) and a page table entry (PTE),
wherein, when a TLB miss occurs in association with a memory request, the front-end module checks the PTE,
wherein, when a result of checking the PTE indicates a tag miss, the front-end module calls a miss handler,
wherein the front-end module performs a tag update corresponding to the memory request through the miss handler and offloads a cache-fill command to the back-end module,
wherein the front-end module further includes a page descriptor including a physical page descriptor and a cache page descriptor,
wherein the physical page descriptor includes two additional bits including a cached bit and a non-cacheable bit,
wherein the cached bit indicates whether a corresponding page is cached in a DRAM cache,
wherein the non-cacheable bit indicates whether the corresponding page is cacheable, and
wherein the cached bit and the non-cacheable bit are added to unused fields of the PTE.

* * * * *